(12) United States Patent
Inose (10) Patent No.: US 8,819,780 B2
(45) Date of Patent: Aug. 26, 2014

(54) INFORMATION PROCESSING SYSTEM, INFORMATION PROCESSING APPARATUS, AND INFORMATION PROCESSING METHOD

(75) Inventor: Koji Inose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1493 days.

(21) Appl. No.: 12/195,761

(22) Filed: Aug. 21, 2008

(65) Prior Publication Data

US 2009/0055903 A1 Feb. 26, 2009

(30) Foreign Application Priority Data

Aug. 23, 2007 (JP) ................................. 2007-217454

(51) Int. Cl.
*H04L 9/32* (2006.01)
*G06F 21/41* (2013.01)

(52) U.S. Cl.
CPC ...................................... *G06F 21/41* (2013.01)
USPC .............. 726/4; 726/2; 726/5; 726/8; 726/20; 713/170; 713/182; 713/185; 709/227

(58) Field of Classification Search
USPC ............ 726/2, 4, 5, 8, 20; 713/170, 182, 185; 209/227
See application file for complete search history.

(56) References Cited

U.S. PATENT DOCUMENTS

| | | | |
|---|---|---|---|
| 7,711,748 B2* | 5/2010 | Bright et al. .................. | 707/783 |
| 7,774,612 B1* | 8/2010 | Deutschmann et al. ...... | 713/182 |
| 2002/0059431 A1* | 5/2002 | Terada ........................... | 709/227 |
| 2003/0070069 A1* | 4/2003 | Belapurkar et al. .......... | 713/155 |
| 2004/0098595 A1* | 5/2004 | Aupperle et al. ............. | 713/185 |
| 2004/0139108 A1* | 7/2004 | Tang et al. .................. | 707/104.1 |
| 2005/0108546 A1* | 5/2005 | Lehew et al. ................. | 713/182 |
| 2006/0075474 A1 | 4/2006 | Takeuchi et al. | |
| 2006/0178924 A1* | 8/2006 | Yagiura ............................ | 705/8 |
| 2007/0266139 A1* | 11/2007 | Guan et al. .................... | 709/223 |
| 2008/0046740 A1* | 2/2008 | Narayanan et al. ........... | 713/176 |
| 2008/0072300 A1* | 3/2008 | Garbow et al. ................... | 726/8 |
| 2009/0031286 A1* | 1/2009 | Yee et al. ...................... | 717/120 |

FOREIGN PATENT DOCUMENTS

| | | |
|---|---|---|
| JP | 2005-35210 | 2/2005 |
| JP | 2006-134301 | 5/2006 |
| JP | 2007-125777 | 5/2007 |

* cited by examiner

*Primary Examiner* — Saleh Najjar
*Assistant Examiner* — Peiliang Pan
(74) *Attorney, Agent, or Firm* — Fitzpatrick, Cella, Harper & Scinto (57) ABSTRACT

The present invention provides an information processing system, an information processing apparatus, and an information processing method, capable of reducing a load of user authentication on a user, when a specific operation is performed using a plurality of apparatuses. In an embodiment of the present invention, an authentication server searches a device group corresponding to devices identified by device identification information transmitted to the authentication server, and searches a workflow. Subsequently, the authentication server judges whether or not a workflow in operation exists, and, if exists, does not instruct password input but directly instructs device processing.

20 Claims, 10 Drawing Sheets

# INFORMATION PROCESSING SYSTEM, INFORMATION PROCESSING APPARATUS, AND INFORMATION PROCESSING METHOD

BACKGROUND OF THE INVENTION

1. Field of the Invention

The present invention relates to an information processing system, an information processing apparatus, and an information processing method. In more detail, the present invention relates to an information processing system, an information processing apparatus, and an information processing method that change operations thereof according to confidentiality of information to be treated and a state of a user's operation, in a configuration or a work form of a system which operates a multi-functional device as a front-end apparatus for printing or inputting and outputting data.

2. Description of the Related Art

Recently, a composite device has been making a-progress in improvement of high functionality, multi-functionality, high performance, or operability including a user interface, and has come to perform the processing and operation as shown in the following, in addition to the copy operation or the printing an output from a PC. For example, the new processing and operation includes making registration of an image scanned in a device on a server according to the scan information, converting the image into a universal format for transmission to a specified destination via a network, operating jobs listed on an operation screen, etc. In this manner, the composite device has been frequently used for performing a function as a work terminal, including replacement of a part of the job conventionally performed on a PC.

Meanwhile, generally an objective of a task is achieved by performing multiple related operations ("workflow" is used to mean an operation group required for achieving a specific task). Here, it is supposed that each operation accompanies manipulation of a device. For example, a task for making a catalog is supposed to be a task wherein a person shooting an image to be posted prints a catalog sample for a proof in a grade of quality allowing the person to imagine a final print.

First, the image shooter goes to the composite device, inputs image data stored in a digital camera, and makes registration on the server for making the catalog (first process). Then, data for printing is prepared after certain processing and a catalog sample having a laid-out registered image is selected from a print data list displayed on the device for printing (second process).

Note that the device used in the first process and the device used in the second process are not allowed to be the same in convenience of performing the task and in the device functions or performances, and different devices are used. Meanwhile, because an image to be treated has a high confidentiality in copy right, the first process and the second process require user authentication (password input) in addition to user identification (individual identification) by an IC card or the like.

Meanwhile, a conventional technique which performs the user authentication (individual authentication) required in the operation of multiple devices is disclosed in Japanese Patent Laid-Open No. 2005-35210. In this technique, an IC card number identifying an individual person and wireless tag information attached to a belonging of an operator are preliminarily registered associated with each other. Here, Japanese Patent Laid-Open No. 2005-35210 assumes that the wireless tag is worn by a user as a belonging thereof attached to a cloth, an accessory, or the like, or disposed around the user. In Japanese Patent Laid-Open No. 2005-35210, the IC card number and the wireless tag information are acquired and collated for operating the device, and the person is authenticated to be the identical person at a certain level of matching (authentication success); that is, the reading of the wireless tag information works to replace the password input.

In operating multiple devices, it is burdensome for a user to input a password each time. If the number of the devices increases, labor hour therefor also increases proportionally. This problem is solved by Japanese Patent Laid-Open No. 2005-35210. However, the user authentication in Japanese Patent Laid-Open No. 2005-35210, is performed by matching in a combination of the wireless tags worn by the user or disposed around the user, and can not be performed even if one of the wireless tags is lost. Further, there remain problems in security or usability such that, when the IC card and the belonging attached with wireless tag are lost at the same time, a finder thereof can use a false identity, and that it is necessary to make registration each time the belonging is added or changed.

Further, in performing a workflow such as image processing with a high confidentiality, when the above first and second steps are performed using different devices, for example, each of the devices requires the user authentication such as a password input because of the above high confidentiality. That is, the password is input into a first apparatus for performing the first process and the password is required to be input again into a second apparatus for performing the second process.

Even when Japanese Patent Laid-Open No. 2005-35210 is applied to this case, the user authentication by the wireless tag is performed each time in login for each of the devices, and, if the user does not carry even one of the wireless tags for performing the second process, for example, the user can not log in the second apparatus.

Further, there is conventionally a technique called Single Sign-On. By using this technique, when the user authentication is once performed in an operation unit of a certain apparatus, it is possible to access another application without the user authentication as far as the same operation unit is used. This is based on the assumption that usually one operation unit is frequently used monopolistically and exclusively by the one and only user. By this assumption, it is reasonable to presume that, when one-time user authentication is performed in the operation unit of the certain apparatus, the one and only user operating the certain apparatus using the operation unit is a person to be reliable, and therefore a subsequent access does not need further user authentication.

In using such Single Sign-On, however, it is necessary to perform the user authentication such as the password input again, when the apparatus is changed and the operation unit is changed. This is because a user utilizing another apparatus using another operation unit has a high probability of being different from the user who already finished the user authentication. Therefore, when performing a predetermined workflow with multiple devices as described above, it is necessary to input the password each time changing a device for the processing and a more labor hour is required.

SUMMARY OF THE INVENTION

The purpose of the present invention is to provide an information processing system, an information apparatus, and an information processing method capable of reducing a burden of user authentication on a user in performing a specific operation using multiple apparatuses.

A first aspect of the present invention is an information processing system, comprising: a first apparatus including a first request means for requesting input of identification information and input of a password for authenticating the identification information, via an operating means of the first apparatus, in order to permit a user to operate the first apparatus; a second apparatus including a second operating means different from the operating means of the first apparatus and a second request means for requesting input of an identification information and input of a password for authenticating the identification information, via the second operating means, in order to permit a user to operate the second apparatus; and an instruction means for instructing the second request means to skip requesting input of password by the user via the second operating means, when the user is permitted to operate the first apparatus, in order to permit the user, who is permitted to operate the first apparatus, to operate the second apparatus.

A second aspect of the present invention is an information processing apparatus, comprising: an operating means; and a request means for requesting input of identification information and a password for authenticating the identification information via the operating means in order to permit user's operation, wherein when identification information and a password for authenticating the identification information are input from an operating means of a different information processing apparatus, and a user having the identification information is permitted to operate the different information processing apparatus, the request means, if the same identification information as the input identification information is input by the user via the operating means of the information processing apparatus, does not request the input of the password via the operating means of the information processing apparatus.

A third aspect of the present invention is an information processing apparatus, connected to a plurality of apparatuses, comprising: means for acquiring identification information from one of the plurality of apparatuses; means for judging, according to the identification information, whether or not an operation group in operation exists, with reference to a table associating the identification information, an operation group necessary for achieving a specific work, and apparatuses grouped as apparatuses used for processing the operation group, with each other; and means for instructing the apparatus, from which the identification information is acquired, among the plurality of apparatuses to request a password for authenticating the identification information from a user, wherein the instructing means does not perform the instruction when it is judged by the judging means that the operation group in operation exists.

A fourth aspect of the present invention is an information processing method in an information processing system including a first apparatus and a second apparatus, the method comprising: a first request step of requesting input of identification information and input of a password for authenticating the identification information via an operating means of the first apparatus in order to permit a user to operate the first apparatus; and a second request step of requesting input of identification information and input of a password for authenticating the identification information via a second operating means different from the operating means of the first apparatus in order to permit the user to operate the second apparatus, wherein the second request step, when the user is permitted to operate the first apparatus, does not request the input of the password via the second operating means for permitting the user to operate the second apparatus from the user who is permitted to operate the first apparatus.

A fifth aspect of the present invention is an information processing method in an information processing apparatus having an operating means, the method comprising, a request step of requesting input of identification information and a password for authenticating the identification information via the operating means in order to permit user's operation, wherein when identification information and a password for authenticating the identification information are input into an operating means of a different information processing apparatus, and a user having the identification information is permitted to operate the different information processing apparatus, the request step, if the same identification information as the input identification information is input by the user via the operating means of the information processing apparatus, does not request the input of the password via the operating means of the information processing apparatus.

A sixth aspect of the present invention is an information processing method in an information processing apparatus connected to a plurality of apparatuses, the method comprising the steps of: acquiring identification information from one of the plurality of apparatuses; judging, according to the identification information, whether or not an operation group in operation exists, with reference to a table associating the identification information, an operation group necessary for achieving a specific work, and apparatuses grouped as apparatuses used for processing the operation group, with each other; and instructing the apparatus, from which the identification information is acquired, among the plurality of apparatuses to request a password for authenticating the identification information from a user, wherein the instructing step does not perform the instruction when it is judged by the judging step that the operation group in operation exists.

In a group of apparatuses, which are planned to be used in a process of performing a specific workflow, every individual apparatus does not require input of user authentication information (e.g., password) in a phase in which the apparatus is actually used. In using any of the apparatuses, it is possible to perform the above user authentication only by one input and to realize reduction in the burden on the user and security assurance by input of the user authentication information at the same time.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the drawings. Note that elements having the same function are denoted by the same reference numeral and description thereof will be omitted in the drawings described hereinafter.

Using FIG. 1, a representative system configuration performing an embodiment of the present invention will be described.

Reference numeral 101 indicates a first device (first apparatus) operated directly by a user for performing image input, listing of print data, and the like. Reference numeral 102 indicates a communication unit exchanging a user ID (user identification information: information for identifying a user) read from an IC card and a password (user authentication information: information for authenticating a user) input by the user with an authentication server 111. The communication unit 102 can exchange information other than the above information such as information identifying a device (device identification information), for example, with the authentication server 111. Reference numeral 103 indicates an IC card reading unit reading an IC card number identifying the user when the user shows the IC card and acquiring the user ID as the user identification information.

Reference numeral 104 indicates an information processing unit providing a device function that can be utilized after processing of the user identification and the user authentication. This information processing unit 104 includes a CPU performing processing operation such as various calculations, controls, determinations, etc. Besides, the information processing unit 104 includes a ROM storing control programs executed by the CPU for the processing according to the present invention to be described hereinafter using FIG. 2 and the like. Further, the information processing unit 104 includes a RAM or the like storing temporarily data during operation processed by the CPU and input data.

Reference numeral 105 indicates an input operation unit including a keyboard inputting a predetermined instruction, data, etc. or various switches. The first device 101 may include a display unit (not shown in the drawing) performing various displays including an input/setting state of the apparatus. Further, the first device may include an image forming function such as a printer, an image reading function such as a scanner, etc., as needed.

In an embodiment of the present invention, the information processing unit 104 controls each of the above constituents collectively.

In an embodiment of the present invention, when the user shows the IC card to the IC card reading unit 103, the IC card reading unit 103 acquires the user ID from the IC card as the user identification information. Then, when the user inputs the password by operating the input operation unit 105, the first device acquires the password as the user authentication information.

Note that, while the IC card reading is performed for acquiring the user identification information in an embodiment of the present invention, the method for acquiring the user identification information is not limited to the IC card reading. For example, the user may input the ID thereof in the input operation unit 105, and any method may be used as far as the first device 101 can acquire the user identification information.

Reference numeral 106 indicates a second device (second apparatus) having a function equivalent to that of the first device 101. A communication unit 107 and the communication unit 102, an IC card reading unit 108 and the IC card reading unit 103, an information processing unit 109 and the information processing unit 104, and an input operation unit 110 and the input operation unit 105 have functions equivalent to each other, respectively. Note that the second device may also include the above display unit, image forming function, image reading function, etc.

Reference numeral 111 indicates the authentication server managing utilization of the first device 101 and the second device 106. Reference numeral 112 indicates a password management unit examining whether the password input is necessary or not, which is a characteristic feature of the present invention. Reference numeral 113 indicates a user information management unit judging whether a user who is going to use the device is a permitted user or not. Reference numeral 114 indicates a device group management unit, which is used by the password management unit 112, associating a predetermined workflow and a device group related to the processing of the workflow with each other.

Besides, the authentication server 111 includes a control unit (not shown in the drawing) having a CPU (not shown in the drawing) performing processing operations such as various calculations, controls, and determinations. The control unit has a ROM (not shown in the drawing) storing control programs executed by the CPU for the processing according to the present invention to be described hereinafter, using FIG. 2 or the like. Further, the control unit has a RAM (not shown in the drawing) or the like storing temporarily data during operation processed by the CPU and input data.

Further, the authentication server 111 may be provided with an input operation unit including a keyboard inputting a predetermined instruction, data, etc., or a various switches, and a display unit performing various displays including an input/setting state of the apparatus.

In an embodiment of the present invention, the control unit controls each of the above constituents provided in the authentication server 111 collectively.

Figure 1:
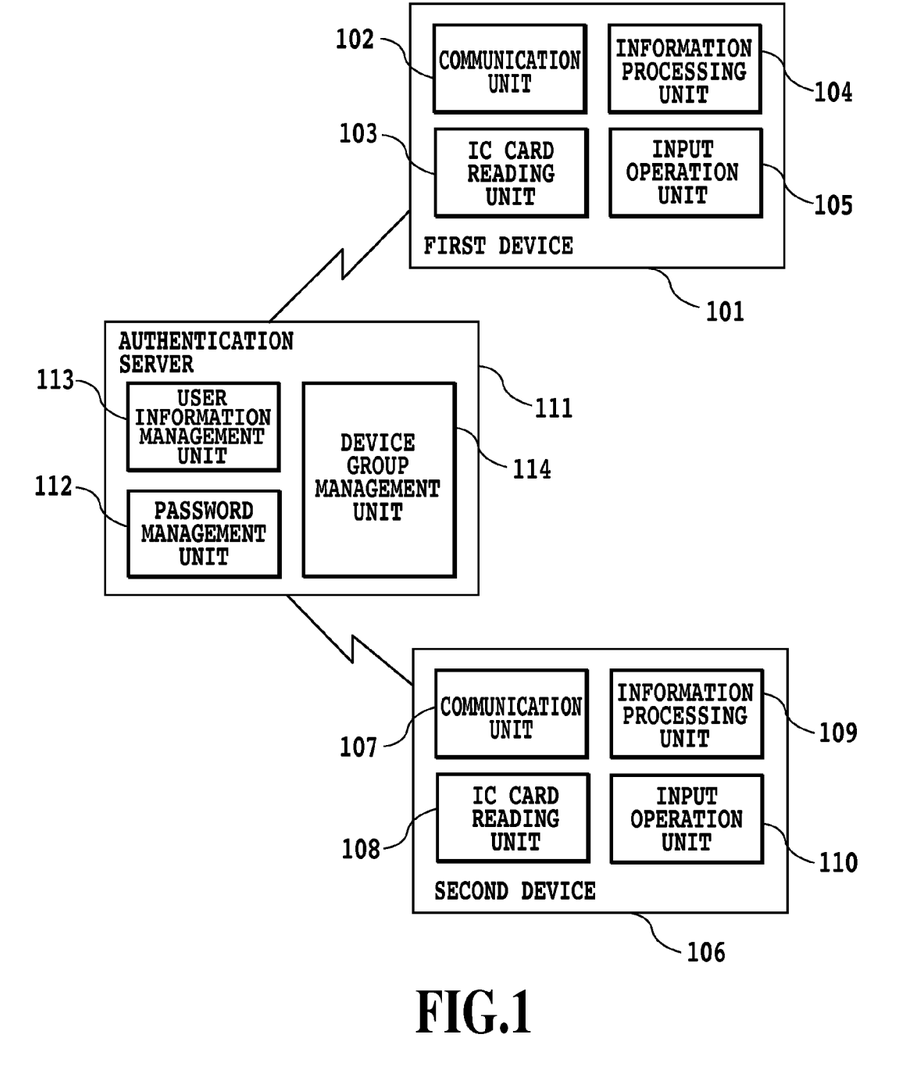
FIG. 1 is a diagram showing a configuration of an information processing system according to an embodiment of the present invention.

In FIG. 1, the authentication server 111 is connected with the first device 101 and the second device 106 via a network so as to exchange information with the first device 101 and the second device 106.

Note that, while the configuration that the first device 101 and the second device 106 are connected to the authenticating server 111 is shown in FIG. 1, another device may be connected to the authentication server 111.

Meanwhile, in an embodiment of the present invention, it is important to manage a device used for processing a certain workflow in association with the certain workflow. That is, it is a characteristic feature of the present invention to manage the devices with the authentication server 111 by grouping the devices related to a certain workflow, and to input the user authentication information by only the first operation for the multiple devices belonging to the group.

The above grouping may be performed by the user's operation associating the workflow with the devices relating to the workflow, in the input operation unit of the authentication server 111.

For example, when the workflow is related to catalog making, the user operates the input operation unit of the authentication server 111 and selects devices necessary for the catalog making in the devices (apparatuses) connected to the authentication server 111. The authentication server 111, according to the selection, groups the selected devices and associates the group with the above workflow of the catalog making.

Figure 3:
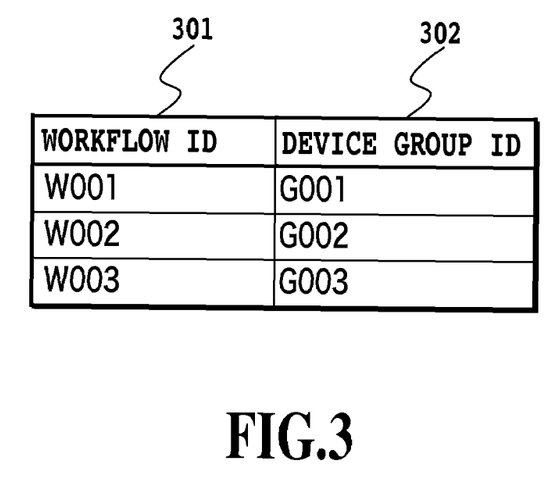
FIG. 3 is a diagram showing a table associating a workflow and a device group identifier with each other, according to an embodiment of the present invention.
Figure 4:
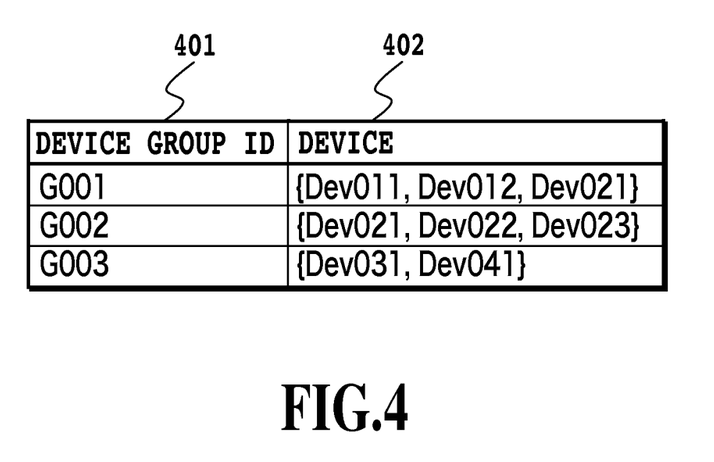
FIG. 4 is a diagram showing a table associating a device group identifier and a device with each other, according to an embodiment of the present invention.

For this association, the authentication server 111, for example, provides a workflow ID (operation group identifier) to each of the workflow for identifying the workflow, and further provides a device group ID (apparatus group identifier) to the grouped devices. Then, a table is generated as shown in FIG. 3 associating the workflow ID 301 and the device group ID 302 with each other. Further, for associating the above device group ID and each device included in the device group identified by the device group ID with each other, a table is generated as shown in FIG. 4. The above association is performed in this manner. Note that the tables shown in FIG. 3 and FIG. 4 are stored in the RAM of the authentication server 111.

Here, there will be described a case in which the first device 101 and the second device 106 are used as apparatuses related to a certain workflow (for example, catalog making). In the following description, it is assumed that, for the above catalog making, the first process is performed in the first device 101 and the second process is performed in the second device.

First, the authentication server 111 groups the devices (apparatuses) used for the catalog making, and associates the catalog making with the first device 101 and the second device 102. The tables as shown in FIG. 3 and FIG. 4 are generated in this manner. In this example, the table as shown in FIG. 3 associates the workflow ID for identifying the catalog making with the device group ID for identifying the device group including the first device 101 and the second device 106. Also, the table as shown in FIG. 4 associates the device group ID with the first device 101 and the second device 106 which are included in the device group identified by the device group ID.

Next, the first device 101 requests the input of the user ID from the user via the IC card reading unit 103 and the input of the password from the user via the input operation unit 105 in order to permit the user to operate the first device 101 (first request). When the user inputs the user ID and the password according to the request, the first device 101 acquires the user ID as the user identification information and the password as the user authentication information via the operation unit (IC card reading unit, input operation unit, etc.). The first device 101, by the user ID and the password, permits the user providing the information to perform predetermined processing related to the catalog making using the first device. Thereby, the user performs the first process (device processing) using the first device.

When the user performs the second process in the second device 106, the second device 106 requests the input of the user ID from the user and input of the password from the user in order to permit the user to operate the second device 106 (second request). Note that, in an embodiment of the present invention, the request of the password input in the second device 106 is not performed in the second request, when the user is permitted to operate the first device 101 which is grouped in the same group for processing the catalog making.

That is, the password input is not requested when the user ID and the password have been input from the operation unit of the first device 101, which is an information processing apparatus different from the second device 106, and the user having the user ID has been permitted to operate the first device 101. That is, the second device 106 does not request the input of the password for permitting the user to operate the second device 106 via the operation unit of the second device 106 (IC card reading unit 108 or input operation unit 110). In other words, the second device 106 permits the user having the user ID to operate the second device 106 without the password input via the operation unit of the second device 106.

In an embodiment of the present invention, the password management unit 112 performs the judgment whether the password input is necessary or not in the second device 106 as described above, according to the table associating the workflow with the device group grouped related thereto. Then, according to the judgment, the password input can be skipped when the password has been already input in a certain device group. Thereby, it is possible to reduce the burden of the user authentication on the user, when a certain workflow is performed using multiple devices.

First Embodiment

With reference to FIG. 2, FIG. 3, FIG. 4, and FIG. 7, there will be described the processing regarding whether the password input is necessary or not, for utilizing the device group associated with the workflow in an information processing system according to the present embodiment.

Figure 2:
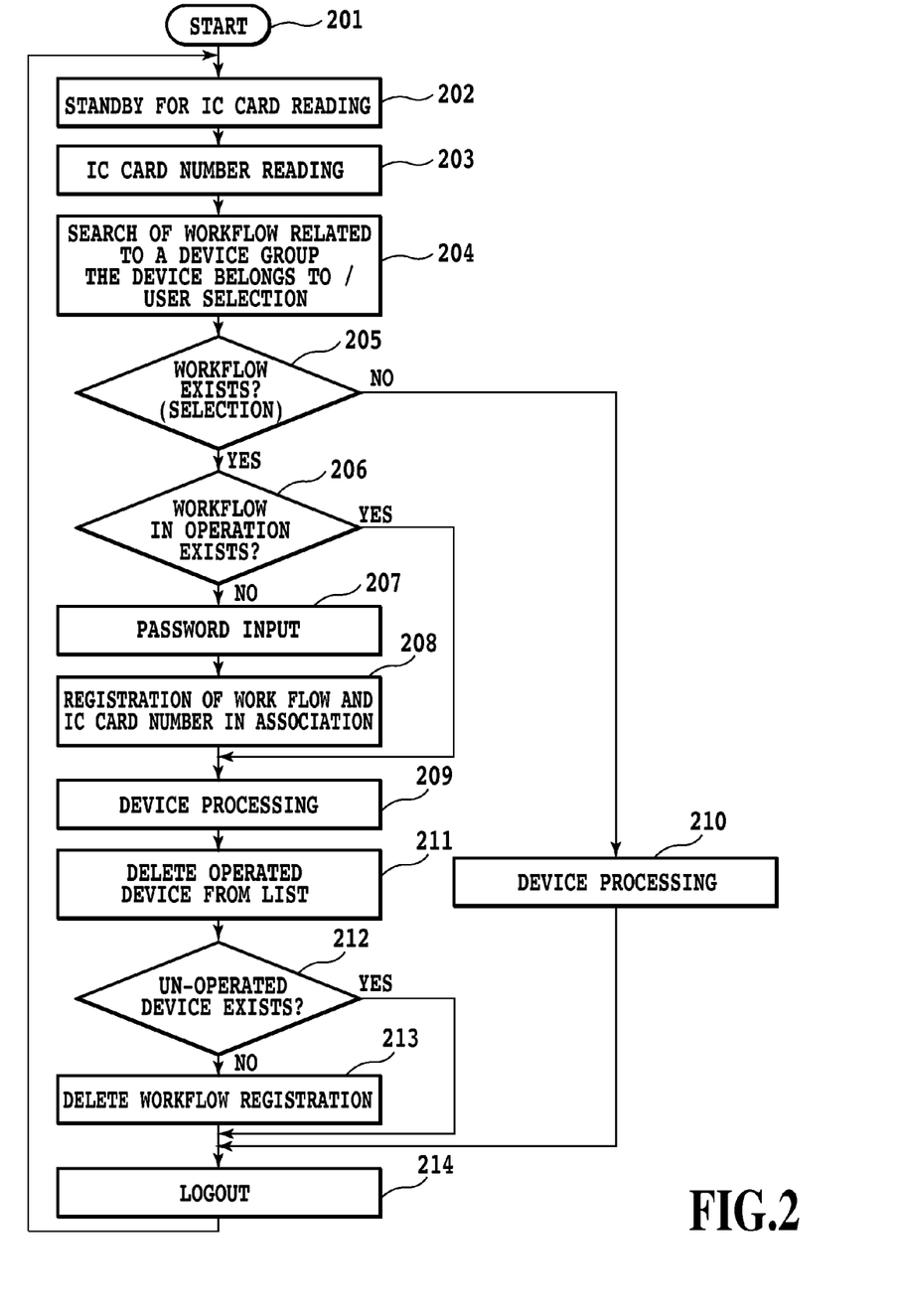
FIG. 2 is a flowchart illustrating a control in judging whether a password is necessary or not, according to an embodiment of the present invention.
Figure 7:
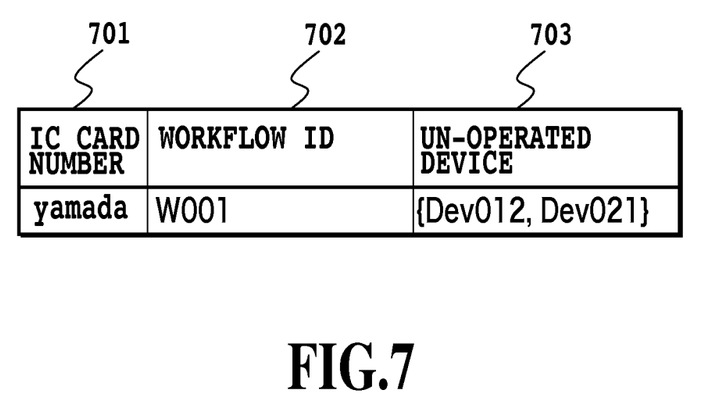
FIG. 7 is a diagram showing a list of a workflow in operation according to an embodiment of the present invention.

FIG. 2 is a flowchart showing a control flow by managing the operation state of the workflow for judging whether the password input is necessary or not, according to the present embodiment. FIG. 3 shows the table associating the workflow ID 301 and the device group ID 302 identifying the device group with each other. FIG. 4 shows the table associating the device group ID 401 with the device ID 402 identifying the device which is an element of the device group. Reference numeral 401 is identical to Reference numeral 302. FIG. 7 is a diagram showing a list of the workflow in operation (in-operation confirmation table). In FIG. 7, Reference numeral 701 indicates the IC card number (user identification information) as a user identifier for identifying the user operating the workflow. Reference numeral 702 indicates a workflow ID during user's operation. Reference numeral 703 indicates an un-operated device which is not yet used in the processing of the workflow, among devices to be operated until the workflow is completed.

In the present embodiment, the in-operation confirmation table as shown in FIG. 7 is generated by the device group management unit 114 when the password input is judged to be necessary for processing a certain workflow in the login of a device included in a group related to the processing.

In the present embodiment, the authentication server 111 is connected with multiple devices including the first device 101. In the following, there will be provided a description focused on the first device 101, for example.

Note that, it is assumed in the present embodiment that the authentication server 111 associates the workflow with the device which processes the workflow as described above, and the authentication server 111 retains the tables shown in FIG. 3 and FIG. 4.

In Step 201, processing according to the present embodiment starts. In Step 202, the first device 101 repeats reading of the IC card periodically. When the user shows the IC card to the IC card reading unit 103, the first device 101 reads the IC card number and acquires the user identification information (user ID) as the identification information, in Step 203. Next, the communication unit 102 transmits the user identification information indicating the read IC card number and the device identification information (device ID) identifying the device, which the user is operating, to the authentication server 111. The authentication server 111, on receiving the user identification information and the device identification information, stores each set of the information into the RAM. Further, the authentication server 111 confirms that the user identified by the transmitted user identification information is a permitted user in the user information management unit 113.

For the processing in Steps 204 to 208, details of the case, in which the workflow in operation does not exist, will be described in the following section "Case in which the workflow in operation does not exist". Meanwhile, details of the case, in which the workflow in operation exists, will be described in the section described below "Case in which the workflow in operation exists".

<Case in which the Workflow in Operation does not Exist>

In Step 204, the password management unit 112 searches a device group corresponding to the devices identified by the device identification information transmitted to the authentication server 111. That is, according to the device identification information (device ID) received from the first device 101, the password management unit 112 extracts a device group ID indicating the device group which includes the device ID. After finishing the search, the password management unit 112 subsequently searches a workflow corresponding to the device group using the table of FIG. 3. That is, the password management unit 112 extracts a workflow ID corresponding to the extracted device group ID. The authentication server 111 stores the extracted workflow ID into the RAM. If multiple workflow IDs exist, one workflow ID is determined for the workflow to be operated by user's selection.

Here, an identifier (device identification information) of the operated device (first device 101) is assumed to be "Dev011". Thereby, a device group including "Dev011" is determined to be "G001" from FIG. 4, and a workflow operatable using the device is determined to be "W001" from FIG. 3. Further, the IC card number, which is the user identification information, is assumed to be "yamada".

Next, the password management unit 112 searches whether or not the workflow in operation exists in Step 204. That is, the password management unit 112 reads the user identification information, device identification information, and the extracted workflow ID from the RAM, and searches whether or not the workflow to be operated from now is in operation, referring to the in-operation confirmation table. In this search, it is judged whether the received user identification information and the extracted workflow ID are associated with each other by the in-operation confirmation table, and if not associated, it is judged that the workflow in operation does not exist. If associated, it is judged that the workflow to be processed from now is already being processed in another device, and the processing described below in <Case in which the workflow in operation exists> is performed.

For performing this judgment, the in-operation confirmation table is generated in a certain workflow processing when a password is input for the login of a device which is included in a group related to the processing. Therefore, if the user identification information and the extracted workflow ID are associated with each other in the in-operation confirmation table, the workflow identified by the workflow ID has already started to be processed. Thereby, it is judged that the workflow in operation exists.

In other words, it is judged that the workflow in operation does not exist, when the IC card number "yamada" and the workflow ID "W001" are not managed to be associated with each other in a table managing the workflow in operation shown in FIG. 7.

In Step 205, the password management unit 112 goes to Step 206, if a workflow is found in the search of Step 204. On the other hand, if not found in the search, the password management unit 112, assuming this requested operation as the operation of a single device, does not request the password input from the first device 101 but transmits information instructing to directly perform the device processing to the first device 101. In Step 210, the first device 101 does not request the password input from the user and performs the predetermined device processing (image take-in, scan, or the like), according to the information. After the device processing is completed, the first device 101 performs logout in Step 214, goes to Step 202, and goes into a standby state.

In Step 206, the password management unit 112 judges whether or not the workflow in operation exists. That is, the password management unit 112 confirms whether or not it is judged in Step 204 that the workflow in operation exist, and, if it is judged that the workflow in operation does not exist, goes to Step 207.

In Step 207, the password management unit 112 transmits password input request information requesting the password input from the user to the first device 101 (device where the user ID is acquired). The first device 101, on receiving the password input request information, prompts the user to input the password with the display unit or the like according to the information. Then, when the user inputs the password on the input operation unit 105, the first device 101 acquires the password as the user authentication information and transmits password acquisition information, indicating that the password has been acquired, to the authentication server 111 via the communication unit 102. Note that the password itself may be transmitted instead of the password acquisition information.

In Step 208, when the authentication server 111 has received the password acquisition information (or password itself), the device group management unit 114 generates the in-operation confirmation table regarding a workflow to be processed from now. The generated table is stored into the RAM of the authentication server 111. Specifically, the device group management unit 114 generates the table associating the user identification information stored in the RAM, the workflow ID extracted in Step 204, and the device ID included in the device group ID, with each other.

That is, the device group management unit 114 determines that the devices identified by the device group ID G001 (devices identified by Dev001, Dev012, and Dev021) to be un-operated devices. The device group management unit 114 associates the identification information Dev011, Dev012, and Dev021 obtained in this manner regarding the un-operated device with the IC card number "yamada" and the workflow ID "W001" and generates the in-operation confirmation table.

In this manner, the present embodiment associates the IC card number which is the user identification information with the in-operation confirmation table for judging whether or not the workflow in operation exists. Then the judgment is performed for the authentication server 111 to be able to determine, using the table, that the user who inputs appropriate user identification information is an authenticated user, and thereby, if the appropriate user identification information is input, the second or the following password input can be skipped.

In Step 209, the authentication server 111 transmits information instructing to perform the device processing to the first device 101. The first device 101, on receiving the information, performs the predetermined device processing (image take-in, scan, or the like).

<Case in which the Workflow in Operation Exists>

As described above, the password management unit 112 judges whether the received user identification information and the extracted workflow ID are associated with each other in the in-operation confirmation table, and, if associated, judges that the work in operation flow exists. In this case, the password management unit 112 judges that the password has been input in grouped devices related to the workflow to be processed from now and does not prompt the password input.

In Step 209, the password management unit 112 transmits information instructing to directly perform the device processing without requesting the password input, to the first device 101, instead of transmitting the password input request information. The first device 101, on receiving the information, performs the predetermined device processing (image take-in, scan, or the like).

As described above, either processing in <Case in which the workflow in operation does not exist> or <Case in which the workflow in operation exists> is performed according to the judgment in Step 206.

Next, in Step 211, the device group management unit 114 deletes the device operated in this time from the un-operated devices in the in-operation confirmation table. In the present example, the device operated in this time is the first device 101 identified by the device ID Dev011, and the Dev012 and Dev021 remain in a column of the un-operated devices as shown in FIG. 7.

In Step 212, the device group management unit 114 judges whether or not there is a device ID in the column of the in-operation confirmation table indicating the un-operated device associated with the workflow ID being processed in this time. If a device ID exists, it is judged that there is an un-operated device, and the process goes to Step 214. On the other hand, if a device ID does not exist, it is judged that all the devices related to the processing of the corresponding workflow have been used, and the device group management unit 114 deletes the corresponding workflow from the in-operation confirmation table in Step 213.

In Step 214, the first device 101 performs logout, goes to Step 202, and goes into the standby state.

Second Embodiment

While the control in the judgment whether the password input is necessary or not is described in the first embodiment not to have an order in the device control, there is supposed to be a case having the order. With reference to FIG. 2, FIG. 5, FIG. 6, and FIG. 8, there will be described the control in the judgment whether the password input is necessary or not, according to the present embodiment, when the order of the device operations is considered.

Figure 5:
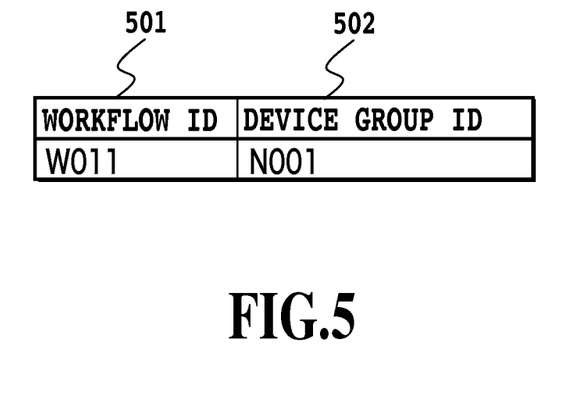
FIG. 5 is a diagram showing a table (having an order) associating the workflow and the device group identifier with each other, according to an embodiment of the present invention.
Figure 6:
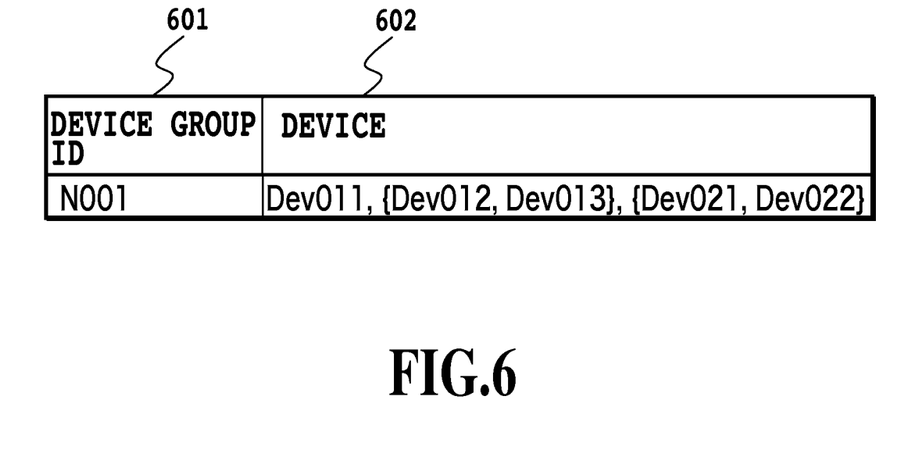
FIG. 6 is a diagram showing a table (having an order) associating the device group identifier and the device with each other, according to an embodiment of the present invention.

In the present embodiment, Reference numerals 501, 502, and 601 are equivalent to Reference numerals 301, 302, and 401, respectively. Reference numeral 602 is basically equivalent to Reference numeral 402. The device ID 602 indicates that the first device to be operated is "Dev011", the second device to be operated is "Dev012" or "Dev013", and the third device to be operated is "Dev021" or "Dev022". In this manner, in the present embodiment, the order of the devices used in a certain workflow processing is also managed in association (managed in order).

Figure 8:
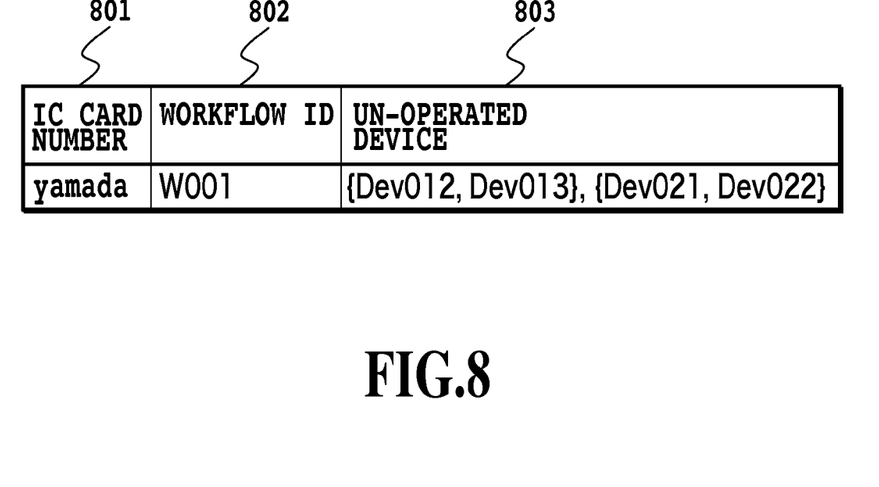
FIG. 8 is a diagram showing a list of a workflow (having an order) in operation according to an embodiment of the present invention.

FIG. 8 is a diagram showing an in-operation confirmation table similar to FIG. 7, and the above order of processing is reflected in an un-operated device column for the management. Reference numeral 801 indicates an IC card number for identifying a user who is operating a workflow. Reference numeral 802 indicates a workflow ID for identifying the workflow being operated. Reference numeral 803 indicates a device (un-operated device) to be operated until the workflow is completed. Being listed in this table means that the workflow in operation exists. Reference numerals 801 and 802 are equivalent to Reference numerals 701 and 702, respectively. Reference numeral 803 indicates that the first device to be operated is "Dev012" or "Dev013" and the second device to be operated is "Dev021" or Dev022".

In the present embodiment, processing of Steps 201 to 214 is equivalent to the processing in the respective steps according to the first embodiment except a part thereof. Hereinafter, the steps different from those of the first embodiment will be described.

In Step 204, the password management unit 112 judges, in searching a workflow, whether or not a device ID received in Step 203 is included in the device IDs 602 at the top thereof, when the workflow in operation does not exist. Further, the password management unit 112 judges whether or not the device ID received in Step 203 is included in the device IDs 803 at the top thereof, also when the workflow in operation exists. In each of the judgments, if included, the workflow is determined to be a candidate of an operatable workflow. If not included, the password management unit 112 judges that a workflow can not be found in the search in Step 205 and goes to Step 210.

Third Embodiment

Figure 9:
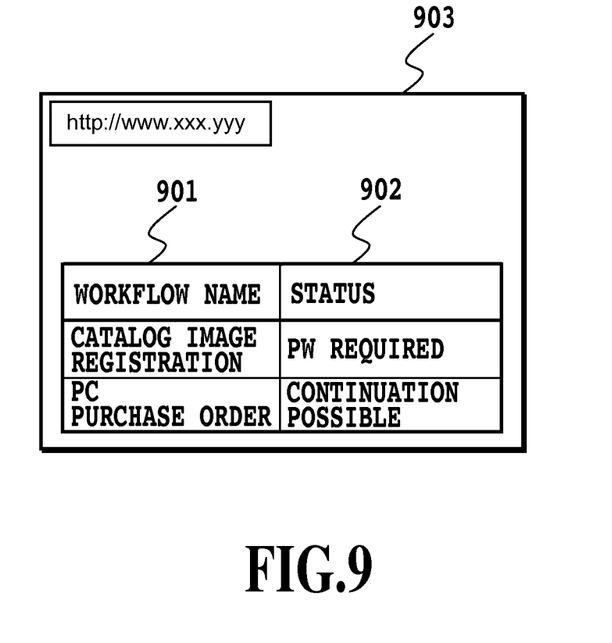
FIG. 9 is a diagram showing a UI selecting a workflow according to an embodiment of the present invention.
Figure 10:
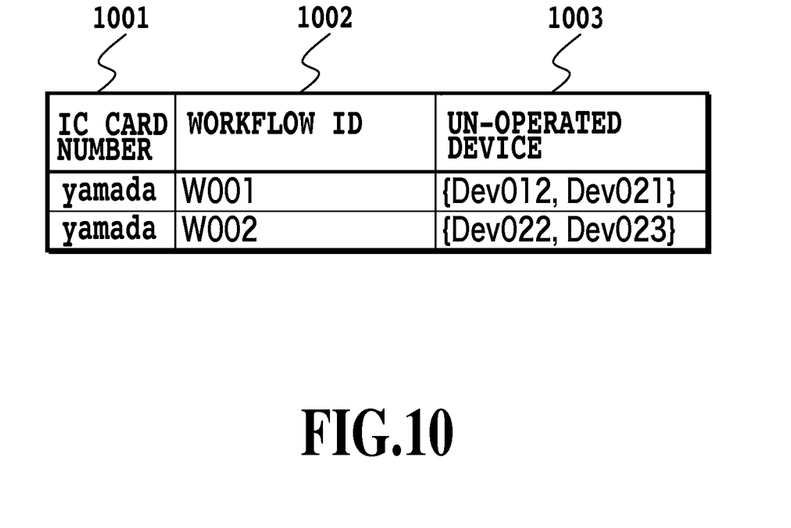
FIG. 10 is a diagram showing a list of a workflow in operation according to an embodiment of the present invention.

With reference to FIG. 7, FIG. 9, and FIG. 10, a user interface (UI) according to the present embodiment will be described when a device to be operated is related to multiple workflows. In FIG. 9, Reference numeral 903 indicates a UI on a device (e.g., UI displayed on the display unit of the first device or the second device), Reference numeral 901 indicates the name of a workflow, and Reference numeral 902 indicates a status showing whether the password input is necessary or not. FIG. 10 is a diagram showing a table into which the table shown in FIG. 7 is changed after screen operation has been performed in FIG. 9.

Assuming the exemplification in FIG. 3, FIG. 4, and FIG. 7, a device having the identifier "Dev021" is operated, for example. Then, according to the control in FIG. 2, the workflow IDs "W001" and "W002" are searched. Here, it is assumed that "password input is unnecessary" for "W001" and "password is necessary" for "W002", and also that "W001" is "catalog image registration" in the workflow name 901 and "W002" is "PC purchase order" in the workflow name 901. A phrase in the status 902 indicates a situation whether the password input is necessary or not. A user selects a desired workflow. When "PC purchase order" is selected, "W002" is added to the list of FIG. 7 (FIG. 10).

The UI shown in FIG. 9 may be displayed on the input display unit by the corresponding device immediately after the IC card reading is finished in Step 203 and may be selected by the user. By the selection, the authentication server 111 can judge whether the password input is necessary or not.

Fourth Embodiment

While the configuration which provides the authentication server 111 independently from the first and the second apparatuses is described in the above embodiments, the authentication server 111 may be provided within the first and/or second apparatus. That is, at least one of the first and second apparatuses may include the password management unit 112, user information management unit 113, and the device group management unit 114.

For example, it is assumed that the second apparatus 106 has the function of the authentication server 111 and the IC card number and the password are input into the first apparatus 101. By the input, the first apparatus 101 permits the user who has input the IC card number to operate the first apparatus 101. At this time, the first apparatus 101 transmits the user identification information indicating the input IC card number to the second apparatus 106 as information for identifying the user who is permitted to operate the first apparatus 101. Subsequently, the second apparatus 106 may perform Steps 204 to 214.

Fifth Embodiment

There will be described a configuration of the present embodiment to switch a state requesting the password input into a state not requesting the password input in the second apparatus 106, when the user identification information and the password are input in the first apparatus 101 and the first apparatus 101 permits the user's operation.

The first apparatus 101, when the IC card number and the password has been input, transmits the user identification information indicating the input IC card number to the second apparatus 106. The second apparatus 106, on receiving the user identification information from the first apparatus 101, stores the user identification information into the memory. Then the second apparatus 106 is switched into the state not requesting the password input for authentication from the user identified by the user identification information received from the first apparatus 101, when the IC card number input is finished. That is, the second apparatus 106 switches from a state requesting both of the IC card number input and the password input into a state not requesting the password input but requesting the IC card number input, according to the user identification information received from the first apparatus 101, in order to permit the user who has been permitted to operate the first apparatus 101 to operate the second apparatus 106.

In this manner, by switching the state regarding the password input, it is possible to perform a predetermined workflow processing in the second apparatus 106 without the password input when the user, who has the same IC card as that in the first apparatus 101, shows just the IC card to the IC card reading unit.

Other Embodiments

The present invention can be applied to a system configured with a plurality of devices (e.g., computer, interface device, reader, printer, etc.) and also to an apparatus composed of one device (composite machine, printer, facsimile apparatus, etc.).

A processing method to store a program operating the configuration of the foregoing embodiment into a storage medium so as to realize the function of the foregoing embodiment, to read the program stored in the storage medium as a code, and to execute the code in a computer also falls within the scope of the foregoing embodiments. That is, the computer readable storage medium is also included in the ranges of the embodiments. Further, in addition to the storage medium storing the above computer program, the computer program itself is included in the foregoing embodiments.

Such storage media include a floppy (registered trade mark) disk, hard disk, optical disk, magneto-optical disk, CD-ROM, magnetic tape, non-volatile memory card, and ROM, for example.

Further, not limited to the method performing the processing using a single program stored in the above storage medium, a method operating on an OS in conjunction with other software or functions of extension boards in order to perform the operations of the foregoing embodiments also falls within the scope of the embodiments.

From the above description about each of the embodiments, it is apparent that Single Sign-On is different from each of the embodiments.

Single Sign-On assumes, as described hereinabove, that usually one operation unit is frequently used monopolistically and exclusively by the one and only user. By this assumption, it is reasonable to presume that, when one-time user authentication is performed in an operation unit of a certain apparatus, the one and only person performing operation using the operation unit is a person to be reliable, and therefore a subsequent access needs not further user authentication.

When another apparatus is utilized using an operation unit thereof, however, it is necessary to perform the user authentication such as the password input again. The reason is that a user utilizing another apparatus using another operation unit has a high probability of being different from the user who already finished the user authentication.

Meanwhile, in each of the embodiments, if the user authentication is performed once, the user authentication is not required again even when a different apparatus is utilized using an operation unit thereof. This embodiment assumes that a certain IC card is owned by the one and only user, for example. Then, when the user authentication is performed by the user having the certain IC card, it is reasonable to presume that the IC card is owned by a reliable user (as far as the user does not lose the IC card). Accordingly, the subsequent access does not need the user authentication again.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-217454, filed Aug. 23, 2007, which is hereby incorporated by reference herein in its entirety.

What is claimed is:

1. An information processing system, comprising:
    a first printing apparatus including
        a first touch input unit that receives touch input from a user and
        a first request unit that generates control signals to request touch input of identification information and touch input of a password for authenticating the identification information via said first touch input unit, in order to permit a user to operate said first printing apparatus;
    a second printing apparatus including
        a second touch input unit that receives touch input from a user and is different from said first touch input unit;
        a second request unit that generates control signals to request touch input of identification information and touch input of a password for authenticating the identification information via said second touch input unit, in order to permit a user to operate said second printing apparatus; and
    an instruction unit that generates a control signal to instruct said second request unit to skip requesting touch input of a password via said second operating touch input unit from a user who has been permitted to operate said first printing apparatus, in order to permit the user who has been permitted to operate said first printing apparatus to operate said second printing apparatus.

2. The information processing system according to claim 1, wherein said first printing apparatus, when permitting the user to operate said first printing apparatus, transmits information for identifying the user, who is permitted to operate said first printing apparatus, to said second printing apparatus.

3. The information processing system according to claim 1, wherein said first printing apparatus, when permitting the user to operate said first printing apparatus, transmits information for identifying the user, who is permitted to operate said first printing apparatus, to said second printing apparatus; and
said second printing apparatus is switched from a state of requesting the touch input of the identification information via said second touch input unit and requesting the touch input of the password via said second touch input unit to a state of not requesting the touch input of the password via said second touch input unit but requesting the touch input of the identification information via said second touch input unit, in order to permit the user, who is permitted to operate said first printing apparatus, to operate said second printing apparatus.

4. The information processing system according to claim 1, wherein each of said first and second touch input units includes a card input unit for acquiring a card input from a card, and the identification information is information acquired from the card input.

5. A printing apparatus, comprising:
a touch input unit that receives touch input from a user; and
a request unit that generates control signals to request touch input of identification information and touch input of a password for authenticating the identification information via said touch input unit in order to permit a user's operation, wherein
when identification information and a password for authenticating the identification information are input using a touch input unit of a different printing apparatus, and a user having the identification information is permitted to operate the different printing apparatus,
said request unit does not request the touch input of the password via said touch input unit of said printing apparatus, if the same identification information that is input using the touch input unit of the different printing apparatus is input via said touch input unit of said printing apparatus.

6. An information processing apparatus, connected to a plurality of printing apparatuses, comprising:
an acquisition unit that acquires identification information from one of said plurality of printing apparatuses;
a judging unit that judges, in accordance with the identification information, whether or not an operation group in operation exists, with reference to a table associating (i) the identification information, (ii) an operation group necessary for achieving a specific task, and (iii) printing apparatuses grouped as printing apparatuses used for processing the operation group, with each other; and
an instructing unit that instructs the printing apparatus, from which the identification information is acquired, from among said plurality of printing apparatuses, to request touch input of a password for authenticating the identification information from a user using a touch input unit that receives touch input from the user, wherein said instructing unit does not perform the instruction when it is judged by said judging unit that the operation group in operation exists.

7. The information processing apparatus according to claim 6, further comprising:
a group acquisition unit that acquires the operation group;
a management unit that groups printing apparatuses used for processing the operation group from among said plurality of printing apparatuses and associates the grouped printing apparatuses and the operation group with each other; and
a table generation unit that generates the table by associating the acquired identification information, the operation group, and the grouped printing apparatuses with each other.

8. The information processing apparatus according to claim 6, wherein the grouped printing apparatuses are managed sequentially in the table.

9. An information processing method in an information processing system including a first printing apparatus and a second printing apparatus, said method comprising:
a first request step of requesting touch input of identification information and touch input of a password for authenticating the identification information via a touch input unit of the first printing apparatus that receives touch input from a user, in order to permit a user to operate the first printing apparatus; and
a second request step of requesting touch input of identification information and touch input of a password for authenticating the identification information via a second touch input unit different from the touch input unit of the first printing apparatus, in order to permit the user to operate the second printing apparatus, wherein
when the user is permitted to operate the first printing apparatus, said second request step does not request the touch input of the password via the second touch input unit for permitting the user to operate the second printing apparatus from the user who is permitted to operate the first printing apparatus.

10. The information processing method according to claim 9, wherein, when the user is permitted to operate the first printing apparatus, information for identifying the user permitted to operate the first printing apparatus is transmitted from the first printing apparatus to the second printing apparatus.

11. The information processing method according to claim 9, wherein,
when the user is permitted to operate the first printing apparatus, information for identifying the user permitted to operate the first printing apparatus is transmitted from the first printing apparatus to the second printing apparatus, and
the second printing apparatus is switched from a state requesting the touch input of the identification information via the second touch input unit and requesting the touch input of the password via the second touch input unit to a state not requesting the touch input of the password via the second touch input unit but requesting the touch input of the identification information via the second touch input unit, in order to permit the user, who is permitted to operate the first printing apparatus, to operate the second printing apparatus.

12. The information processing method according to claim 9, wherein the touch input unit of the first printing apparatus includes a card input unit that acquires a card input from a card, and the identification information is information acquired from the card input.

13. An information processing method in a printing apparatus having a touch input unit that receives touch input from a user, said method comprising, a request step of requesting touch input of identification information and touch input of a password for authenticating the identification information via the touch input unit in order to permit a user's operation, wherein when identification information and a password for authenticating the identification information are touch input via touch input unit of a different printing apparatus, and a user having the identification information is permitted to operate the different printing apparatus, said request step, if the same identification information as the identification information input via the touch input unit of the different printing apparatus is touch input by the user via the touch input unit of the printing apparatus, does not request the touch input of the password via the touch input unit of the printing apparatus.

14. An information processing method in an information processing apparatus connected to a plurality of printing apparatuses, said method comprising the steps of:

acquiring identification information from one of the plurality of printing apparatuses;

judging, according to the identification information, whether or not an operation group in operation exists, with reference to a table associating (i) the identification information, (ii) an operation group necessary for achieving a specific task, and (iii) printing apparatuses grouped as printing apparatuses used for processing the operation group, with each other; and instructing the printing apparatus, from which the identification information is acquired, from among the plurality of printing apparatuses, to request touch input of a password for authenticating the identification information from a user using a touch input unit that receives touch input from the user, wherein said instructing step does not perform the instruction when it is judged in said judging step that the operation group in operation exists.

15. The information processing method according to claim 14, further comprising the steps of:

acquiring the operation group;

managing by grouping printing apparatuses used for processing the operation group from among the plurality of printing apparatuses and by associating the grouped printing apparatuses and the operation group with each other; and generating the table by associating i) the acquired identification information, (ii) the operation group, and (iii) the grouped printing apparatuses with each other.

16. The information processing method according to claim 14, wherein the grouped printing apparatuses are managed sequentially in the table.

17. A computer program, embodied in a non-transitory computer readable medium, for causing a computer to execute an information processing method according to claim 9.

18. A computer program, embodied in a non-transitory computer readable medium, for causing a computer to execute an information processing method according to claim 13.

19. A computer program, embodied in a non-transitory computer readable medium, for causing a computer to execute an information processing method according to claim 14.

20. An information processing system, comprising:

a first printing apparatus including a first touch input device that receives touch input from a user and is configured to permit a user to input identification information and to manually input a password; and a first processor that controls said first printing apparatus to request that a user input identification information and input a password for authenticating the identification information, via said first touch input device, and to permit a user to operate said first printing apparatus upon authentication of the identification information input via said first touch input device;

a second printing apparatus including a second touch input device that receives touch input from a user and is configured to permit a user to input identification information and to manually input a password; and a second processor that controls said second printing apparatus to request that a user input identification information and input a password for authenticating the identification information, via said second touch input device, and to permit a user to operate said second printing apparatus upon authentication of the identification information input via said second touch input device; and a third processor that generates a control signal to instruct said second processor to skip requesting touch input of a password via said second touch input device from a user who has been permitted to operate said first printing apparatus, in order to permit the user who has been permitted to operate said first printing apparatus to operate said second printing apparatus.

* * * * *